(12) United States Patent
Goren et al.

(10) Patent No.: US 11,227,016 B2
(45) Date of Patent: Jan. 18, 2022

(54) SCALABLE LOCKING TECHNIQUES

(71) Applicant: Vast Data Ltd., Tel Aviv (IL)

(72) Inventors: Avi Goren, Tel Aviv (IL); Oren Ashkenazi, Haifa (IL); Asaf Levy, Tel Aviv (IL)

(73) Assignee: Vast Data Ltd., Tel Aviv (IL)

( * ) Notice: Subject to any disclaimer, the term of this patent is extended or adjusted under 35 U.S.C. 154(b) by 104 days.

(21) Appl. No.: 16/816,905

(22) Filed: Mar. 12, 2020

(65) Prior Publication Data

US 2021/0286802 A1 Sep. 16, 2021

(51) Int. Cl.
*G06F 16/901* (2019.01)
*G06F 16/23* (2019.01)
*H04L 29/08* (2006.01)

(52) U.S. Cl.
CPC ...... *G06F 16/9027* (2019.01); *G06F 16/2343* (2019.01); *H04L 67/1002* (2013.01)

(58) Field of Classification Search
None
See application file for complete search history.

(56) References Cited

U.S. PATENT DOCUMENTS

| | | | |
|---|---|---|---|
| 5,983,225 A * | 11/1999 | Anfindsen | G06F 16/2343 |
| 7,213,021 B2 | 5/2007 | Taguchi et al. | |
| 8,661,175 B2 | 2/2014 | Sundrani et al. | |
| 10,108,624 B1 | 10/2018 | Vermeulen et al. | |
| 10,133,511 B2 | 11/2018 | Muth et al. | |
| 10,545,927 B2 | 1/2020 | Strauss et al. | |
| 2006/0004758 A1* | 1/2006 | Teng | G06F 16/2343 |
| 2006/0248245 A1 | 11/2006 | Ninomiya et al. | |
| 2010/0268904 A1 | 10/2010 | Sheffield et al. | |
| 2010/0274772 A1 | 10/2010 | Samuels | |
| 2014/0115579 A1 | 4/2014 | Kong | |
| 2016/0239239 A1 | 8/2016 | Tin et al. | |
| 2016/0350325 A1 | 12/2016 | Wang et al. | |
| 2016/0357776 A1 | 12/2016 | Sundaram et al. | |
| 2017/0090779 A1 | 3/2017 | Barzik et al. | |
| 2017/0147497 A1 | 5/2017 | Phelan et al. | |
| 2017/0149890 A1 | 5/2017 | Shamis et al. | |

(Continued)

OTHER PUBLICATIONS

Lomet, Key Range Locking Strategies for Improved Concurrency Feb. 10, 1993, Digital Equipment Corp., https://www.hpl.hp.com/techreports/Compaq-DEC/CRL-93-2.pdf.*

(Continued)

*Primary Examiner* — Jason G Liao
(74) *Attorney, Agent, or Firm* — M&B IP Analysts, LLC

(57) ABSTRACT

Systems and methods for scalable locking. A method includes adding a first lock entry representing a pending lock to a first tree, the first lock entry indicating a range to be locked; checking at least a portion of at least one second tree to determine whether a conflicting lock exists for the first lock entry among at least one second lock entry based on the range to be locked, wherein each of the first tree and the at least one second tree is a data structure including a plurality of nodes representing at least a plurality of attributes, wherein the plurality of attributes of the at least one second tree includes the at least one second lock entry; committing the pending lock when no conflicting lock exists; and resolving the pending lock based on a resolution of the conflicting lock when a conflicting lock exists.

24 Claims, 5 Drawing Sheets

(56) References Cited

U.S. PATENT DOCUMENTS

| | | |
|---|---|---|
| 2017/0220506 A1 | 8/2017 | Brown et al. |
| 2017/0251058 A1 | 8/2017 | Zachariassen et al. |
| 2017/0286144 A1 | 11/2017 | Barzik et al. |
| 2018/0198765 A1 | 7/2018 | Maybee et al. |
| 2018/0253255 A1 | 9/2018 | Jain et al. |
| 2019/0377490 A1 | 12/2019 | Hallak et al. |

OTHER PUBLICATIONS

Ramakrishnan et. al., Database Management Systems 2000, McGraw-Hill, 2nd ed., pp. 528-532.*
Gray et al., Granularity of locks in a shared data base Sep. 1975, VLDB '75: Proceedings of the 1st International Conference on Very Large Data Bases, pp. 428-451.*

* cited by examiner

SCALABLE LOCKING TECHNIQUES

TECHNICAL FIELD

The present disclosure relates generally to network lock management, and more specifically to scalable network lock management.

BACKGROUND

In data storage, locks are used to prevent reads or other writes while a write is occurring in order to avoid potential readers-writers problems. As storage systems become larger (i.e., more data being stored), these storage systems face challenges in managing resources related to locks and locked data. These challenges are further exacerbated in distributed storage systems, which may have thousands or tens of thousands of clients and therefore demands a large amount of locking. More specifically, as the number of clients of a distributed storage service increases, the demand for locking tends to increase. Existing solutions face challenges in accommodating such demand.

In particular, when data is large enough that multiple blocks are needed to store the data, a range of blocks needs to be locked. Existing solutions face challenges with efficiently locking ranges of blocks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for scalable locking. The method comprises: adding a first lock entry representing a pending lock to a first tree, the first lock entry indicating a range to be locked; checking at least a portion of at least one second tree to determine whether a conflicting lock exists for the first lock entry among at least one second lock entry based on the range to be locked, wherein each of the first tree and the at least one second tree is a data structure including a plurality of nodes, wherein the plurality of nodes of each tree represents at least a plurality of attributes, wherein the plurality of attributes of the at least one second tree includes the at least one second lock entry; committing the pending lock when it is determined that no conflicting lock exists; and resolving the pending lock based on a resolution of the conflicting lock when it is determined that a conflicting lock exists.

Certain embodiments disclosed herein also include a non-transitory computer readable medium having stored thereon instructions for causing a processing circuitry to execute a process, the process comprising: adding a first lock entry representing a pending lock to a first tree, the first lock entry indicating a range to be locked; checking at least a portion of at least one second tree to determine whether a conflicting lock exists for the first lock entry among at least one second lock entry based on the range to be locked, wherein each of the first tree and the at least one second tree is a data structure including a plurality of nodes, wherein the plurality of nodes of each tree represents at least a plurality of attributes, wherein the plurality of attributes of the at least one second tree includes the at least one second lock entry; committing the pending lock when it is determined that no conflicting lock exists; and resolving the pending lock based on a resolution of the conflicting lock when it is determined that a conflicting lock exists.

Certain embodiments disclosed herein also include a system for scalable locking. The system comprises: a processing circuitry; and a memory, the memory containing instructions that, when executed by the processing circuitry, configure the system to: add a first lock entry representing a pending lock to a first tree, the first lock entry indicating a range to be locked; check at least a portion of at least one second tree to determine whether a conflicting lock exists for the first lock entry among at least one second lock entry based on the range to be locked, wherein each of the first tree and the at least one second tree is a data structure including a plurality of nodes, wherein the plurality of nodes of each tree represents at least a plurality of attributes, wherein the plurality of attributes of the at least one second tree includes the at least one second lock entry; commit the pending lock when it is determined that no conflicting lock exists; and resolve the pending lock based on a resolution of the conflicting lock when it is determined that a conflicting lock exists.

Certain embodiments disclosed herein also include a distributed storage system. The distributed storage system comprises: a plurality of storage nodes (DNodes), wherein the plurality of DNodes is configured to store at least one tree and a plurality of data blocks, wherein the at least one tree includes a plurality of attributes, wherein the plurality of attributes includes at least one lock entry; and a plurality of compute nodes (CNodes), wherein each CNode has access to each of the DNodes, wherein each CNode is configured to receive an access command and to execute the access command based on the at least one tree, wherein each CNode is further configured to resolve pending locks based on the at least one lock entry.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
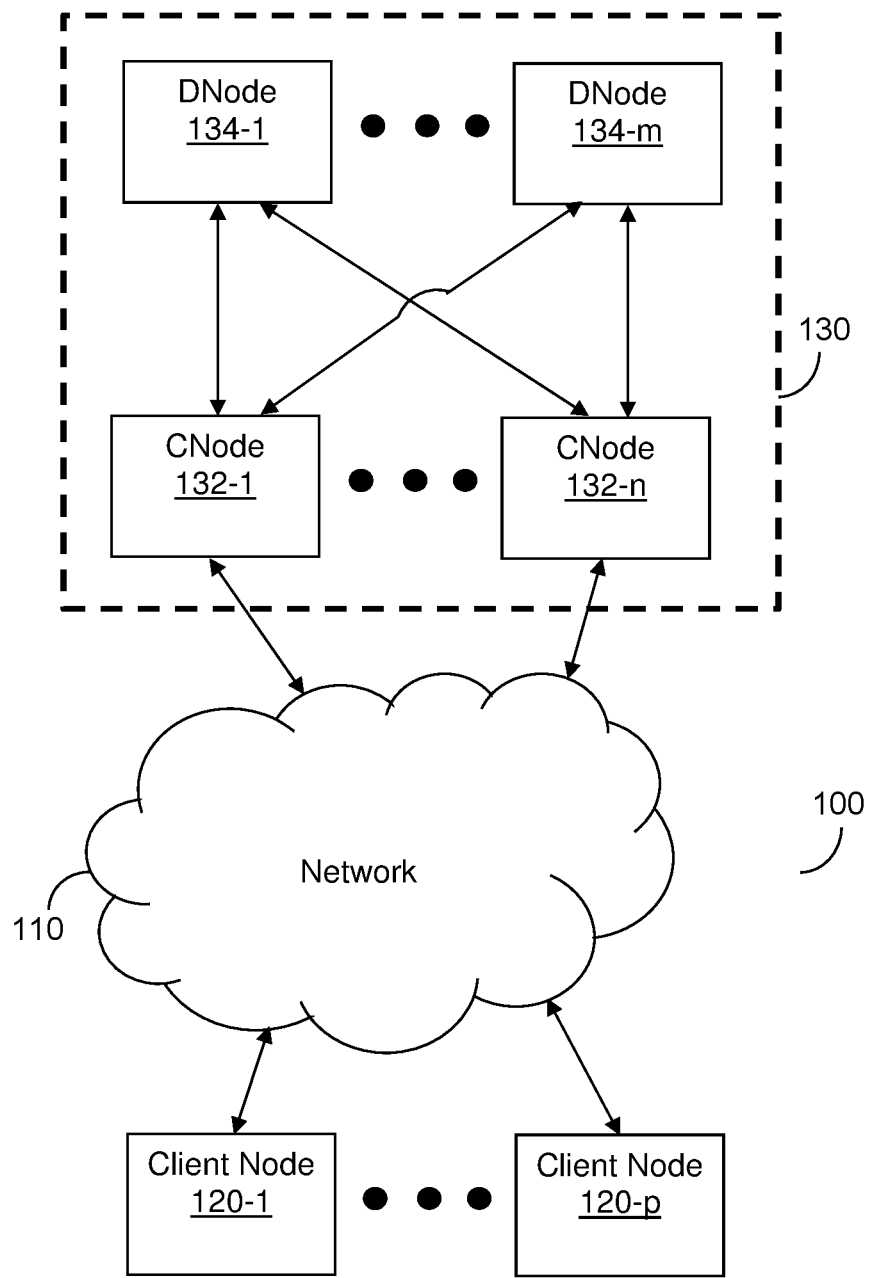
FIG. 1 is a network diagram showing a distributed storage system utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

When performing a lock, a system performing the lock on a range of data needs to check for existing locks on that range to see if any impermissible overlap exists. It has been identified that, when performing locks, existing solutions may need to check large numbers of data blocks to make sure that an existing lock is not already in place and that this number of blocks may increase as the number of clients served by a distributed storage system increases. To this end, it would be desirable to minimize the number of blocks that needs to be checked to identify potential conflicts.

To address the challenges noted above, the disclosed embodiments provide effective scaling of locks in distributed storage system. Thus, the disclosed embodiments may be utilized to provide distributed storage services that support large numbers of concurrent clients which may seek to lock conflicting ranges of data.

More specifically, according to the disclosed embodiments, lock entries are stored in tree data structures (hereinafter referred to as "trees"). More specifically, each tree includes nodes representing data of the tree such as, but not limited to, attributes. The attributes include at least the lock entries, and may further include other data (e.g., data linking nodes of the tree to each other). The lock entries indicate, for example, a transaction identifier (ID) for a lock, an identifier of the range to be locked, and the like. The tree is capable of growing or shrinking as needed by adding or removing nodes, thereby allowing for scaling of locking in accordance with demand on a storage system utilizing the tree.

In some embodiments, the nodes of each tree include elements. Each element is a persistent metadata structure. In addition to the lock entries, the elements may store pointers to other elements and to underlying data. The elements may be stored across storage nodes of a distributed storage system. In a further embodiment, the elements are accessible to compute nodes of the distributed storage system, where each compute node has access to data of each of the storage nodes.

In an embodiment, the lock entries stored in the tree are utilized to efficiently check for conflicting locks. Specifically, when a new lock is required, a lock entry representing the new lock (now a pending lock) is added to the tree, and the lock entries of the tree, of other trees, or both, are checked for conflicts, i.e., locks directed ranges of data that overlap with the new lock. The new lock is committed if no conflicts exist. A conflict exists when an impermissible overlap is identified. In an embodiment, an overlap between two locks is impermissible if one or both of the locks is an exclusive lock. If a conflict does exist, the new lock is resolved (i.e., either committed or cancelled) based on how the conflicting lock was resolved. To this end, execution may wait until the conflicting lock is resolved or until a timeout event occurs. When the resolution of the conflicting lock includes cancellation of that lock, the new lock is committed. When the resolution of the conflicting lock includes commitment of that lock, the new lock is cancelled.

In an embodiment, the nodes are partitioned into multiple trees representing different granularities of locks, and the multiple trees are used to provide shared locks. More specifically, the granularities are different size ranges of locked data, and attributes of lock entries include an indication of the granularity of the lock. Thus, the shared lock is added to one of the multiple trees storing shared lock data, and attempted exclusive locks are checked for conflicts with the shared locks as indicated in the shared lock trees. As a non-limiting example, a first granularity range may include data having ranges between 1 byte and 1 kilobyte (kB) in size, and a second granularity range may include data having ranges between 1 kB and 1 megabyte (MB) in size. Different granularity ranges may be defined such that they do not overlap.

Storing shared locks in trees partitioned according to granularity allows for reducing the amount of data that needs to be checked to identify overlapping ranges to be used for the shared locks. More specifically, the checking may be further based on granularity with respect to different granularity trees such that only relevant ranges in each tree need to be checked.

It has also been identified that, in many cases, checking for overlapping ranges by scanning from right to left (i.e., from the offset ranges with the highest starting offset to the offset ranges with the lowest starting offset rather than vice-versa) in trees organized based on starting offset typically results in identifying the overlapping ranges earlier in the scan. Likewise, for trees organized based on ending offset, overlapping ranges may be identified earlier in the scan by scanning from left to right (i.e., from offset ranges with the lowest ending offset to offset ranges with the highest ending offset). Thus, when many scans are being performed, the average amount of scanning to identify overlapping ranges may be decreased by scanning from right to left for trees organized based on starting offset and from left to right for trees organized based on ending offset. Accordingly, in at least some disclosed embodiments, overlapping ranges are checked for by scanning from right to left in order to improve efficiency of the scanning.

FIG. 1 is an example network diagram 100 illustrating a distributed storage system utilized according to various disclosed embodiments. The network diagram 100 includes a distributed storage compute node 132, a network 110, and client nodes 120-1 through 120-p (referred to as a client node 120 or as client nodes 120 for simplicity).

The distributed storage system 510 may be configured as described further in U.S. patent application Ser. No. 16/002, 676, assigned to the common assignee, the contents of which are incorporated by reference.

The distributed storage compute node 132 includes compute nodes 132-1 through 132-n (referred to as a CNode 132 or as CNodes 132 for simplicity) and storage nodes (DNodes) 134-1 through 134-m (referred to as a DNode 134 or as DNodes 134 for simplicity). The distributed storage compute node 132 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 132 are configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

The CNodes 132 collectively act as a distributed transaction manager for accessing data in the DNodes 134. To this end, each CNode 132 may be configured to implement transaction manager functions by assigning and updating transaction identifiers (IDs) for locks defined with respect to data stored in the DNodes 134. Persistent memory portions of the DNodes 134 store transaction IDs indicating the state of each transaction. An example implementation of a transaction manager by the CNodes 132 is described further in U.S. patent application Ser. No. 16/122,036, assigned to the common assignee, the contents of which are hereby incorporated by reference.

As the CNodes 132 do not store the data to be accessed by client nodes or the metadata used for navigating to locations in the DNodes 134, such data and metadata do not need to be recovered when one or more of the CNodes 132 fails. Additionally, CNodes 132 may be added or removed without disrupting data stored in the storage compute node 132. An example schematic diagram of a CNode 132 is described below with respect to FIG. 5.

The client node 120 is configured to send access commands to the distributed storage compute node 132 via the network 110. The CNodes 132 are configured to receive access commands from the client nodes 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVMe) over Fabrics may be utilized to enable such access.

The access may include navigating an element store distributed across the DNodes 134 to access data in data blocks stored in the DNodes 134. The CNodes 132 are configured to navigate the element store to read the data blocks and to modify the element store by, for example, splitting blocks, merging blocks, and the like. To this end, the CNodes 132 may be configured to allocate new blocks, write data to blocks, read data from blocks, add and remove pointers in blocks, and the like.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

At least a portion of the data blocks may be temporarily included in the elements and stored in, for example, 3D Xpoint memory of the DNodes 134 before being migrated from the 3D Xpoint memory to Flash memory of the DNodes 134. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory.

In an embodiment, the CNodes 132 are configured to perform scalable locking as described herein. To this end, the CNodes 132 are configured to add entries to trees stored in the DNodes 134. In an embodiment, the trees stored in the DNodes 134 include an exclusive lock tree storing exclusive lock entries and one or more shared lock trees storing shared lock entries. More specifically, the entries include conditional lock entries representing pending or existing transactions. The CNodes 132 are further configured to check for potential conflicts and to commit locks only when there are no conflicts.

It should be noted that FIG. 1 is merely an example, and that the disclosed embodiments are not limited to application in the particular distributed storage compute node 132. The disclosed embodiments are generally applicable to storage systems using DAGs and may be applied to storage systems having different configurations than that shown in FIG. 1. The disclosed embodiments may further be used in systems requiring hierarchies (e.g., DAGs) other than storage systems without departing from the scope of the disclosure.

Figure 2:
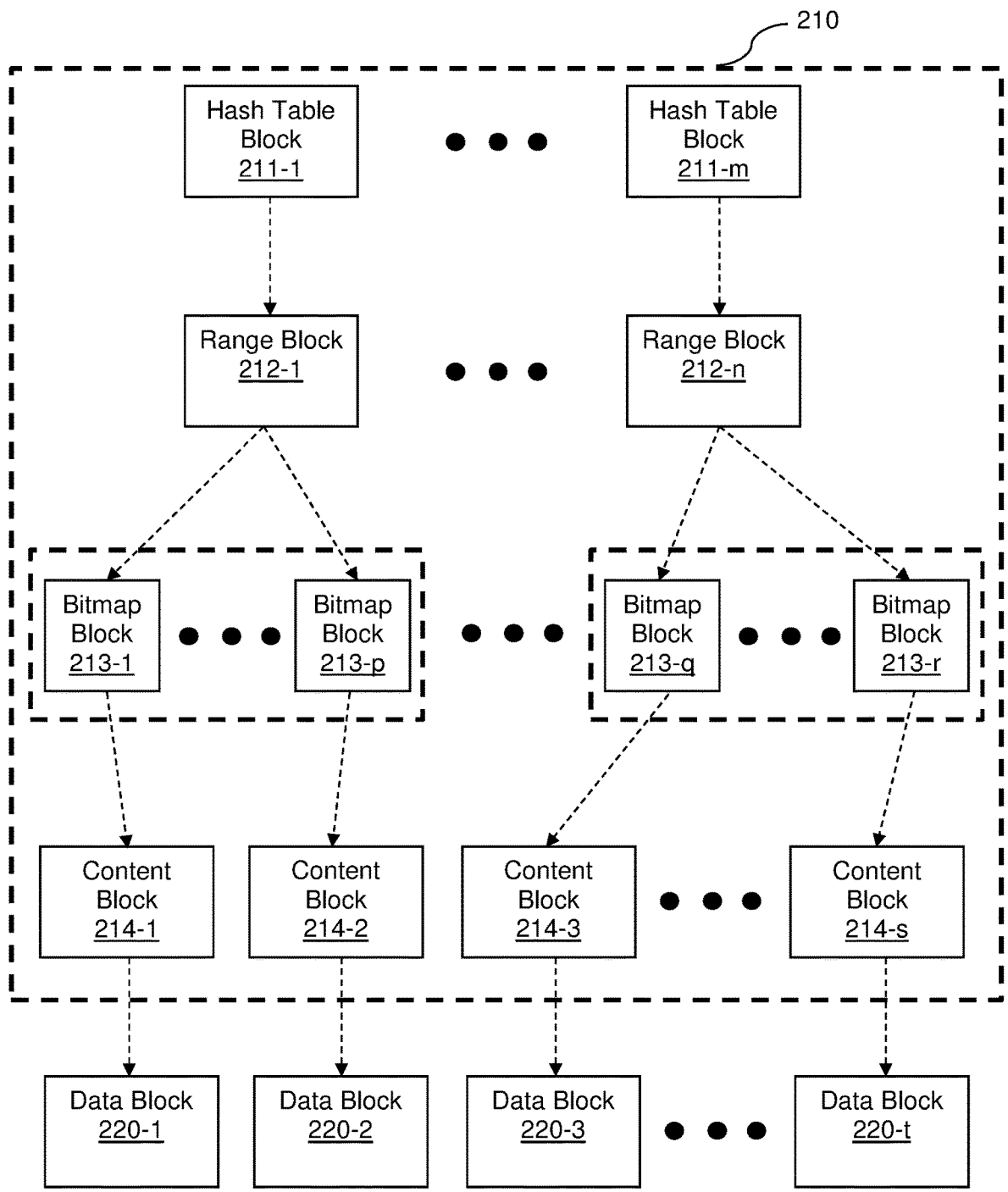
FIG. 2 is a virtualization model of an element store layer utilized according to an embodiment.

FIG. 2 is an example virtualization model 200 of the storage system 100 utilized according to an embodiment. The virtualization model 200 is a tree 210 of metadata blocks. The bottom level of the metadata blocks 210 points to data blocks 220, which are locations in a physical storage. In an example implementation, the metadata blocks include hash table blocks 211, range blocks 212, bitmap blocks 213, and content blocks 214.

The hash table blocks 211 collectively provide a hash table and point to the range blocks 212. The hash table may be maintained as a consistent hash table by balancing portions of the hash table among the DNodes 150 such that the DNodes 150 store equal portions of the hash table, for example by storing equal numbers of the hash table blocks 211. When memory devices (e.g., 3D Xpoint devices) storing the hash table are added or removed, the hash table may be balanced among the remaining memory devices. The hash table includes the root of each element.

The range blocks 212 point to the bitmap blocks 213 using offset ranges such that each range block 212 points to multiple bitmap blocks 213 in the offset range. When there are more bitmap blocks than there are available range block pointers for a first range block 212, a second range block 212 may point to a second range of the bitmap blocks 213.

The bitmap blocks 213 include lock entries. The lock entries include at least transaction identifiers (IDs) representing their respective locks as well as information related to the data to be locked (e.g., a range of data blocks to be locked). The locks represented by the transaction IDs may be, for example, locks of pending or existing transactions. Accordingly, the bitmap blocks 213 are read in order to identify conflicts as described below with respect to FIG. 3.

The content blocks 214 include pointers to the data blocks 120. The bitmap blocks 213 and the content blocks 214 may further include a time attribute.

It should be noted that the levels of the metadata blocks shown in FIG. 2 are merely illustrative, and that the disclosed embodiments are not limited to the particular arrangements of or pointing among the metadata blocks shown in FIG. 2. Further, the disclosed embodiments are not limited to the types of blocks shown in FIG. 2. As a non-limiting example, a B-tree may be utilized without departing from the disclosed embodiments.

More information about the example tree 210 used as an element store in a distributed storage system as well as growing and shrinking of such a tree may be found in U.S. patent application Ser. No. 16/002,676, assigned to the common assignee, the contents of which are hereby incorporated by reference.

Figure 3:
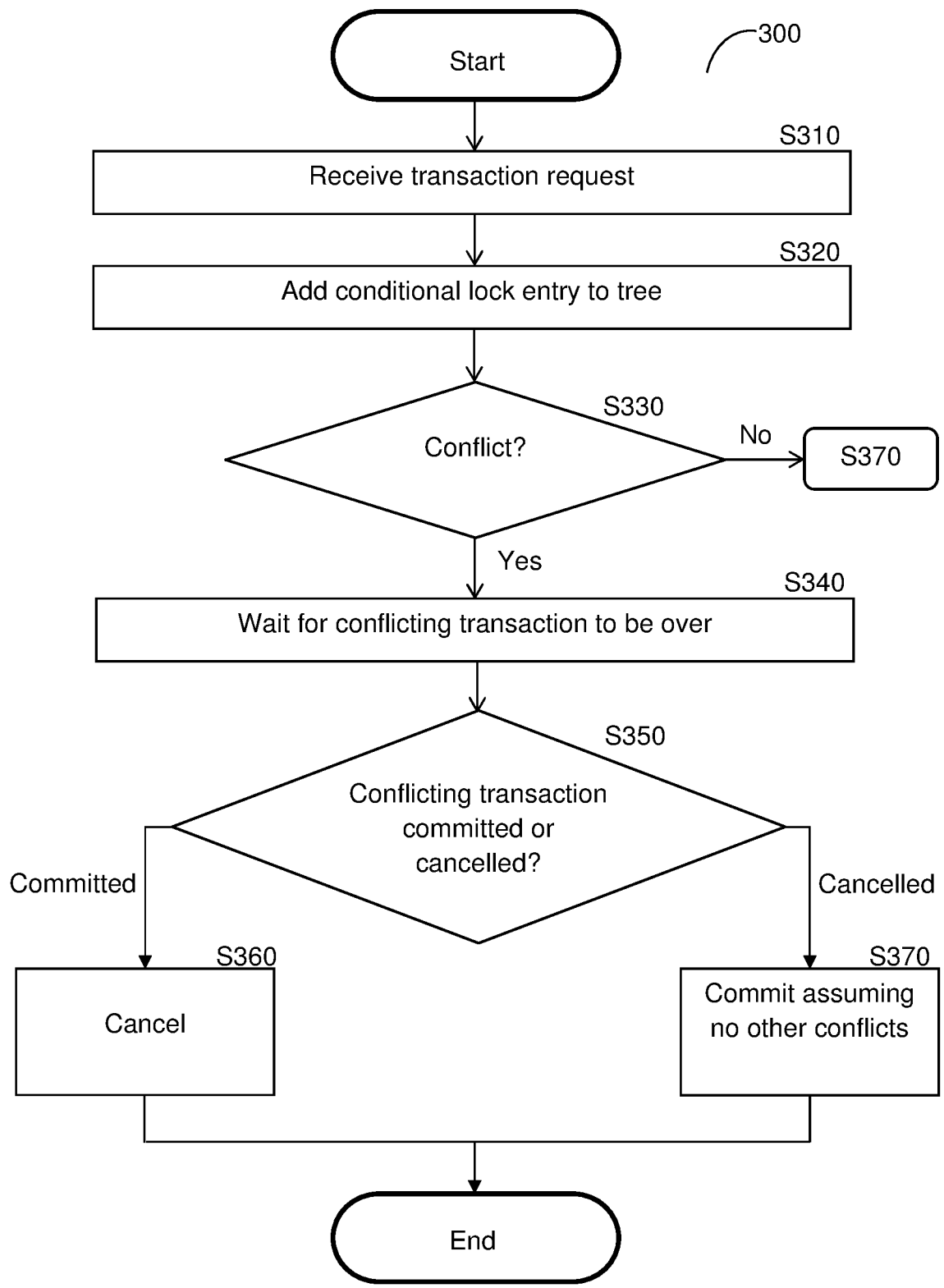
FIG. 3 is a flowchart illustrating a method for scalable locking according to an embodiment.

FIG. 3 is an example flowchart 300 illustrating a method for scalable locking according to an embodiment. In an embodiment, the method is performed by one of the CNodes 132, FIG. 1.

At S310, a request to perform a first transaction that requires a lock is received. The request may be received, for example, from one of the client nodes 120, FIG. 1. The lock for the requested transaction may be an exclusive lock (e.g., a lock for a write transaction) or a shared lock (e.g., a lock for a read transaction). Each exclusive lock is not permitted to lock ranges that overlap with ranges of other locks, while shared locks are permitted to lock ranges that overlap with other shared locks.

At S320, a conditional lock is added to the tree. In an embodiment, S320 includes adding a first lock entry to the tree indicating the conditional lock. The first lock entry may include, but is not limited to, a transaction identifier (ID) and a data range to be locked. In an example implementation, the conditional lock entry is added to one of the bitmap blocks 213, FIG. 2.

At S330, it is checked if the conditional lock has a conflict with a second existing lock indicated in the tree and, if so, execution continues with S340; otherwise, execution continues with S370. In an embodiment, S330 includes scanning an exclusive lock tree to detect conflicts with exclusive locks based on the range required by the transaction of the conditional lock. The exclusive lock tree stores lock entries representing exclusive locks.

In a further embodiment, S330 includes scanning multiple shared lock trees based on the range required by the transaction of the conditional lock. The shared lock trees store shared lock entry data. As noted above, shared locks are permitted to lock overlapping ranges with each other while exclusive locks are not permitted to lock ranges that overlap with any other locks. As a result, in an embodiment, the shared lock trees are scanned when the requested lock is an exclusive lock.

In an embodiment, the multiple shared lock trees have different granularities as discussed herein. To this end, some embodiments include scanning the shared lock trees based on these granularities such that only a subset of potentially scannable offsets are scanned. Identifying conflicts with shared locks based on granularities is described further herein below with respect to FIG. 4.

At S340, when it is determined that there is a conflict between the conditional lock and an existing lock, execution waits until the transaction associated with the conflicting lock has been resolved. In an embodiment, a transaction has been resolved when the transaction has either become committed or cancelled.

In another embodiment, execution may wait until a timeout event occurs (e.g., a predetermined period of time has passed). In a further embodiment, when the timeout event occurs, execution continues with S320 by adding a new conditional lock with a new transaction ID and cancelling the originally added conditional lock. In other words, when the timeout event occurs, the first transaction may be attempted again.

At S350, when the conflicting transaction is over, it is determined whether the conflicting transaction has been committed or cancelled. If the conflicting transaction has been committed, execution continues with S360; if the conflicting transaction has been cancelled, execution continues with S370.

At S360, when the conflicting transaction has been committed, the transaction associated with the conditional lock is cancelled.

At S370, when there are no conflicts, the transaction associated with the conditional lock is committed. When it was determined that there was a conflict between the conditional lock and an existing lock, S370 may further include resuming a scan for other conflicts. To this end, in such an embodiment, execution may continue with S330 until the scan is completed and all conflicting transactions have been resolved. In another embodiment, multiple conflicting transactions may be identified and execution may wait until all conflicting transactions have been resolved.

Figure 4:
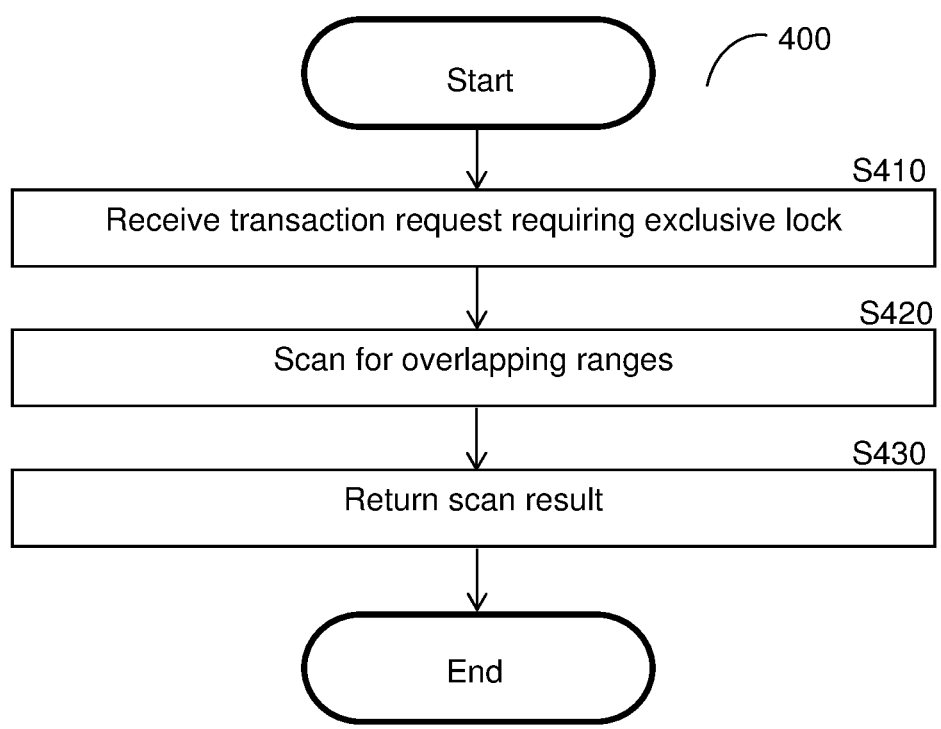
FIG. 4 is a flowchart illustrating a method for identifying conflicts with shared locks using different granularity trees according to an embodiment.

FIG. 4 is an example flowchart 400 illustrating a method for identifying conflicts with shared locks using different granularity trees according to an embodiment. In an embodiment, the method is performed by one of the CNodes 132, FIG. 1.

At S410, a transaction request for a transaction that requires an exclusive lock is received. The request may be received, for example, from one of the client nodes 120, FIG. 1.

At S420, multiple trees storing shared lock entry data are scanned in order to determine if there are any shared locks having overlapping ranges with the requested exclusive lock that would be required by the requested transaction. In at least some implementations, the trees may be scanned in any order, and any or all of the trees may be scanned in parallel. The scanning within each tree may occur in an order based on how the tree is organized. As non-limiting examples, a tree may be scanned from right to left when organized with respect to starting offsets of ranges and from left to right when organized with respect to ending offsets of ranges.

In an embodiment, to check each tree for overlapping ranges, only a subset of possible offsets of the tree needs to be checked. In a further embodiment, the subset to be checked for each tree is based on the required range for the new lock and the granularity of the tree. Further, the offsets to be checked may be different depending on how shared locks in the trees are organized (e.g., with respect to starting offsets as compared to based on ending offsets).

As a non-limiting example for checking for overlapping ranges based on granularity using trees organized by starting offsets, an exclusive lock is required for the range of blocks from 10 MB through 11 MB. In this example, a first tree holds shared locks ranging in size from 1 B to 1 KB, a second tree holds shared locks ranging in size from 1 KB to 1 MB, and a third tree holds shared locks ranging in size from 1 MB to 1 GB. To scan these trees, offsets between 9.999 MB (i.e., 10 MB−1 KB) and 11 MB are checked for the first tree, offsets between 9 MB (i.e., 10 MB−1 MB) and 11 MB are checked for the second tree, and offsets between 0 MB (i.e., 10 MB−1 GB) and 11 MB are checked for the third tree.

As a non-limiting example for checking for overlapping ranges based on granularity using trees organized by ending offsets, an exclusive lock is required for the range of blocks from 10 MB through 11 MB. In this example, a first tree holds shared locks ranging in size from 1 B to 1 KB, a second tree holds shared locks ranging in size from 1 KB to 1 MB, and a third tree holds shared locks ranging in size from 1 MB to 1 GB. To scan these trees, offsets between 10 MB and 11.001 MB (i.e., 1 MB+1 KB) are checked for the first tree, offsets between 10 MB and 12 MB (i.e., 11 MB+1 MB) are checked for the second tree, and offsets between 10 MB and 1011 MB (i.e., 11 MB+1 GB) are checked for the third tree.

At S430, a result of scanning the trees is returned. In an embodiment, the result indicates whether there are any conflicting shared locks. In a further embodiment, the result indicates each conflicting shared lock identified during the scan.

Figure 5:
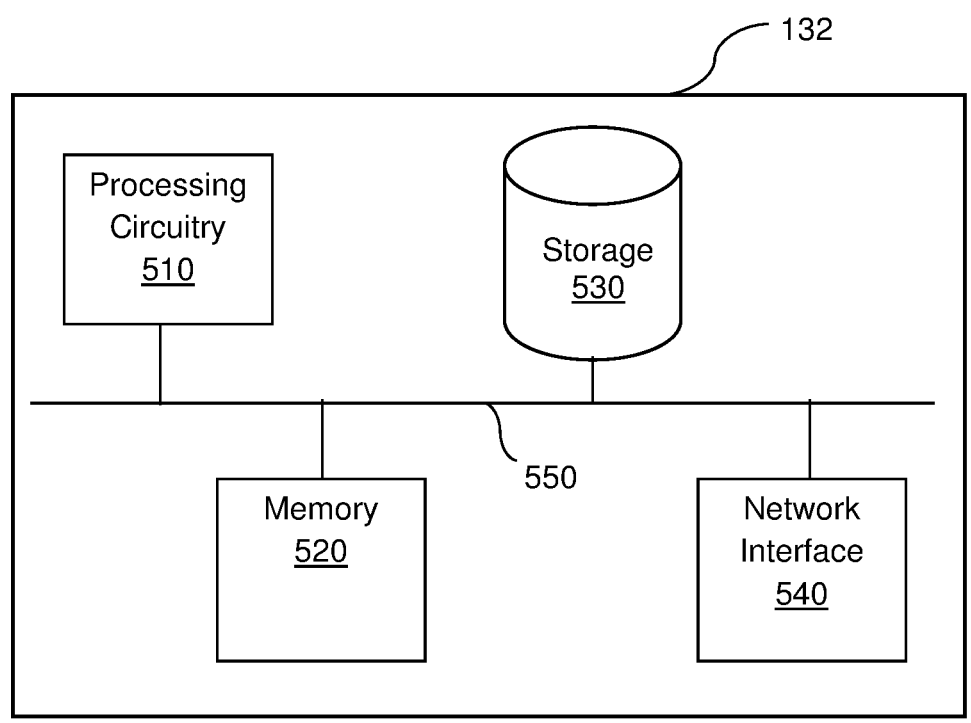
FIG. 5 is a schematic diagram of a compute node according to an embodiment.

FIG. 5 is an example schematic diagram of a compute node 132 according to an embodiment. The compute node 132 includes a processing circuitry 510 coupled to a memory 520, a storage 530, and a network interface 540. In an embodiment, the components of the compute node 132 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the compute node 132 to communicate with the storage nodes 134 for the purpose of, for example, sending access commands, receiving data, and the like. Further, the network interface 540 allows the compute node 132 to communicate with the client nodes 120 for the purpose of receiving data requests, sending data received from the storage nodes 134, and the like.

It should be understood that the embodiments described herein are not limited to the specific architecture illustrated in FIG. 5, and other architectures may be equally used without departing from the scope of the disclosed embodiments.

It should be noted that various embodiments are described with respect to a tree, but the disclosed embodiments may be applied to other hierarchies without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for scalable locking, comprising:
   adding a first lock entry representing a pending lock to a first tree, the first lock entry indicating an address range to be locked, wherein the first tree is selected from a plurality of lock trees, wherein different lock trees of the plurality of lock trees are associated with different granularities, wherein a granularity of a certain lock tree defines the range size of locked ranges indicated by lock entries of the certain lock tree;

checking a portion of second lock entries of at least one second tree of the plurality of lock trees to determine whether a conflicting lock exists for the first lock entry in the portion of the second lock entries, based on the address range to be locked, wherein each lock tree of the plurality of lock trees is a distinct structure;

committing the pending lock when it is determined that no conflicting lock exists; and resolving the pending lock based on a resolution of the conflicting lock when it is determined that the conflicting lock exists.

2. The method of claim 1, wherein the first lock entry indicates a first range of addresses, wherein each second lock entry of the portion indicates a respective second range of addresses, wherein checking the portion of the second lock entries further comprises:

querying each second lock entry indicating a respective second range of addresses that is at least in part overlapping with the first range of addresses.

3. The method of claim 1, wherein a size of the portion is based on a granularity of the at least one second tree.

4. The method of claim 1, wherein a size of the portion is based on a granularity of the at least one second tree and the address range to be locked.

5. The method of claim 1, wherein the conflicting lock is pending concurrently with the pending lock, wherein resolving the pending lock further comprises:

waiting for the conflicting lock to resolve, wherein the pending lock is resolved when the conflicting lock has been resolved.

6. The method of claim 1, wherein resolving the pending lock further comprises:

cancelling the pending lock when the resolution of the conflicting lock is a commitment of the conflicting lock; and committing the pending lock when the resolution of the conflicting lock is a cancellation of the conflicting lock.

7. The method of claim 1, further comprises: scanning multiple trees of the plurality of lock trees.

8. The method of claim 7, wherein the multiple trees are scanned in parallel.

9. The method of claim 1, wherein the first tree is selected according to a size of the address range to be locked.

10. A non-transitory computer readable medium having stored thereon instructions for causing a processing circuitry to execute a process, the process comprising:

adding a first lock entry representing a pending lock to a first tree, the first lock entry indicating an address range to be locked, wherein the first tree is selected from a plurality of lock trees, wherein different lock trees of the plurality of lock trees are associated with different granularities, wherein a granularity of a certain lock tree defines the range size of locked ranges indicated by lock entries of the certain lock tree;

checking a portion of second lock entries of at least one second tree of the plurality of lock trees to determine whether a conflicting lock exists for the first lock entry in the portion of the second lock entries, based on the address range to be locked, wherein each lock tree of the plurality of lock trees is a distinct structure;

committing the pending lock when it is determined that no conflicting lock exists; and resolving the pending lock based on a resolution of the conflicting lock when it is determined that the conflicting lock exists.

11. A system for scalable locking, comprising:

a processing circuitry; and a memory, the memory containing instructions that, when executed by the processing circuitry, configure the system to:

add a first lock entry representing a pending lock to a first tree, the first lock entry indicating an address range to be locked, wherein the first tree is selected from a plurality of lock trees, wherein different lock trees of the plurality of lock trees are associated with different granularities, wherein a granularity of a certain lock tree defines the range size of locked ranges indicated by lock entries of the certain lock tree;

check a portion of second lock entries of at least one second tree of the plurality of lock trees to determine whether a conflicting lock exists for the first lock entry in the portion of the second lock entries, based on the address range to be locked, wherein each lock tree of the plurality of lock trees is a distinct structure;

commit the pending lock when it is determined that no conflicting lock exists; and resolve the pending lock based on a resolution of the conflicting lock when it is determined that the conflicting lock exists.

12. The system of claim 11, wherein the first lock entry indicates a first range of addresses, wherein each second lock entry of the portion indicates a respective second range of addresses, wherein the system is further configured to:

query each second lock entry indicating a respective second range of addresses that is at least in part overlapping with the first range of addresses.

13. The system of claim 11, wherein a size of the portion is based on a granularity of the at least one second tree.

14. The system of claim 11, wherein a size of the portion is based on a granularity of the at least one second tree and the address range to be locked.

15. The system of claim 11, wherein the conflicting lock is pending concurrently with the pending lock, wherein the system is further configured to:

wait for the conflicting lock to resolve, wherein the pending lock is resolved when the conflicting lock has been resolved.

16. The system of claim 11, wherein the system is further configured to:

cancel the pending lock when the resolution of the conflicting lock is a commitment of the conflicting lock; and commit the pending lock when the resolution of the conflicting lock is a cancellation of the conflicting lock.

17. The system of claim 11, wherein the system is further configured to: scan multiple trees of the plurality of lock trees.

18. The system of claim 17, wherein the multiple trees are scanned in parallel.

19. The system of claim 11, wherein the first tree is selected according to a size of the address range to be locked.

20. A distributed storage system, comprising:

a plurality of storage nodes (DNodes), wherein the plurality of DNodes is configured to store a plurality of trees and a plurality of data blocks, wherein the plurality of trees includes a plurality of attributes, wherein the plurality of attributes includes at least one lock entry, wherein each tree of the plurality of trees is a distinct structure, wherein each of the plurality of trees has a distinct granularity with respect to locks stored in the tree; and a plurality of compute nodes (CNodes), wherein each CNode has access to each of the DNodes, wherein each CNode is configured to receive an access command and to execute the access command based on the plurality of trees, wherein each CNode is further configured to resolve pending locks based on the at least one lock entry.

21. The distributed storage system of claim 20, wherein each CNode is further configured to:

scan the plurality of trees for at least one overlapping range based on the distinct granularity of each of the plurality of trees.

22. The distributed storage system of claim 21, wherein the plurality of trees is scanned in parallel.

23. The distributed storage system of claim 20, wherein each of the plurality of trees is organized with respect to starting offset ranges, wherein each of the plurality of trees is scanned from highest starting offset range to lowest starting offset range.

24. The distributed storage system of claim 20, wherein each tree is a data structure including a plurality of elements, wherein each element is a persistent metadata structure, wherein the plurality of elements includes the plurality of attributes and a plurality of pointers.

\* \* \* \* \*